(12) United States Patent
Rutman et al.

(10) Patent No.: US 10,577,035 B2
(45) Date of Patent: Mar. 3, 2020

(54) METHODS AND APPARATUS TO MOUNT A WHEEL IN MULTIPLE POSITIONS ON A VEHICLE BODY

(71) Applicant: Ford Global Technologies, LLC, Dearborn, MI (US)

(72) Inventors: Matthew B. Rutman, Canton, MI (US); William Reese Cherry, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/906,950

(22) Filed: Feb. 27, 2018

(65) Prior Publication Data
US 2019/0263461 A1    Aug. 29, 2019

(51) Int. Cl.
| B62D 43/00 | (2006.01) |
| B62D 43/02 | (2006.01) |
| B60R 9/06 | (2006.01) |
| B60R 11/00 | (2006.01) |

(52) U.S. Cl.
CPC ............ *B62D 43/02* (2013.01); *B60R 9/06* (2013.01); *B60R 2011/0084* (2013.01); *B60R 2011/0085* (2013.01)

(58) Field of Classification Search
CPC ... B62D 43/02; B60R 9/06; B60R 2011/0084; B60R 2011/0085
USPC ..................................................... 224/42.21
See application file for complete search history.

(56) References Cited

U.S. PATENT DOCUMENTS

| 3,869,149 | A | * | 3/1975 | Dixon | .................... | B60D 1/66 |
| | | | | | | 280/475 |
| 3,916,317 | A | * | 10/1975 | Gibson | .................. | H03J 1/045 |
| | | | | | | 116/244 |
| 4,767,038 | A | * | 8/1988 | McVicar | ................ | B62D 43/02 |
| | | | | | | 224/42.12 |
| 4,850,518 | A | * | 7/1989 | Salmon | .................. | B62D 43/04 |
| | | | | | | 224/42.23 |
| 5,076,477 | A | * | 12/1991 | Colgan | ................ | B62D 43/005 |
| | | | | | | 206/304.1 |

(Continued)

FOREIGN PATENT DOCUMENTS

| CN | 201321094 Y | 10/2009 |
| CN | 206202467 U | 5/2017 |

OTHER PUBLICATIONS

Apex, Trailer Spare Tire Carrier, Adjustable Trailer Spare Tire Carrier for 4 or 5 Lug Wheels | Discount Ramps, http://www.discountramps.com/spare-tire-carrier/p/STC-01/, retrieved on Nov. 13, 2017, 3 pages.

(Continued)

*Primary Examiner* — Peter N Helvey
(74) *Attorney, Agent, or Firm* — Raymond Coppielle; Hanley, Flight & Zimmerman, LLC

(57) ABSTRACT

Methods, apparatus, systems and articles of manufacture are disclosed to mount a wheel in multiple positions on a vehicle body. An example apparatus includes a bracket having a first post extending therefrom and an aperture spaced from the first post, the first post to slidably receive one of a plurality of fastener apertures in a vehicle wheel, the aperture of the bracket to receive a fastener extending through a respective other one of the fastener apertures to hold the wheel to a vehicle body in at least two different positions.

20 Claims, 10 Drawing Sheets

(56) References Cited

U.S. PATENT DOCUMENTS

| | | | | |
|---|---|---|---|---|
| 5,560,629 A | * | 10/1996 | Allard | B60D 1/66 |
| | | | | 280/414.2 |
| 6,749,094 B1 | | 6/2004 | Dexel | |
| 7,922,048 B2 | * | 4/2011 | Smith | B62D 43/02 |
| | | | | 224/42.12 |
| 8,251,265 B2 | | 8/2012 | Grudek | |
| 2006/0243769 A1 | | 11/2006 | Lovey et al. | |
| 2006/0285953 A1 | * | 12/2006 | Wooten | B62D 43/002 |
| | | | | 414/463 |
| 2007/0039987 A1 | * | 2/2007 | Osenkowski | B62D 43/002 |
| | | | | 224/504 |
| 2009/0120976 A1 | * | 5/2009 | MacKarvich | B62D 43/002 |
| | | | | 224/42.21 |
| 2017/0174273 A1 | | 6/2017 | Burton et al. | |

OTHER PUBLICATIONS

Ballistic Fabrications, 5-Lug Spare Tire Mounting Point Multiple Bolt Patterns In One Simple Design, 2017, 4 pages.

* cited by examiner

METHODS AND APPARATUS TO MOUNT A WHEEL IN MULTIPLE POSITIONS ON A VEHICLE BODY

FIELD OF THE DISCLOSURE

This disclosure relates generally to vehicles and, more particularly, to methods and apparatus to mount a wheel in multiple positions on a vehicle body.

BACKGROUND

Vehicles may implement a mount to carry a wheel. In some examples, the wheel may function as a spare tire that is of similar size to operational tires on the vehicle. On some vehicles, the wheel mount is located at the rear of the vehicle, mounted to either a trailer hitch or to a mounting system integral to the vehicle. However, many of these known mounts may result in mounting the spare tire in a single location or position that is non-ideal for some operating conditions of the vehicle. For example, in some positions, the spare tire can lower the driver's visibility through a rear window of the vehicle. However, lowering the position at which the spare tire is mounted can reduce the ground clearance of the vehicle and, in some cases, can cover a trailer hitch of the vehicle, rendering it unusable.

SUMMARY

A multi-position wheel mount is disclosed herein. An example apparatus includes a mounting plate to be coupled to a vehicle, a first post extending from the mounting plate, and an aperture in the mounting plate arranged such that the first post and a fastener received by the aperture are to hold a vehicle wheel coupled to the mounting plate at a first position and a second position spaced from the first position.

Another example apparatus includes a bracket having a first post extending therefrom and an aperture spaced from the first post, the first post to slidably receive one of a plurality of fastener apertures in a vehicle wheel, the aperture of the bracket to receive a fastener extending through a respective other one of the fastener apertures to hold the wheel to a vehicle body in at least two different positions.

Another example apparatus includes a wheel mount to be fixed to a vehicle, the wheel mount including means for slidably receiving a first aperture of a vehicle wheel and means for receiving a fastener passing through a second aperture of the vehicle wheel to hold the wheel in at least two different positions relative to the vehicle.

Figure 1:
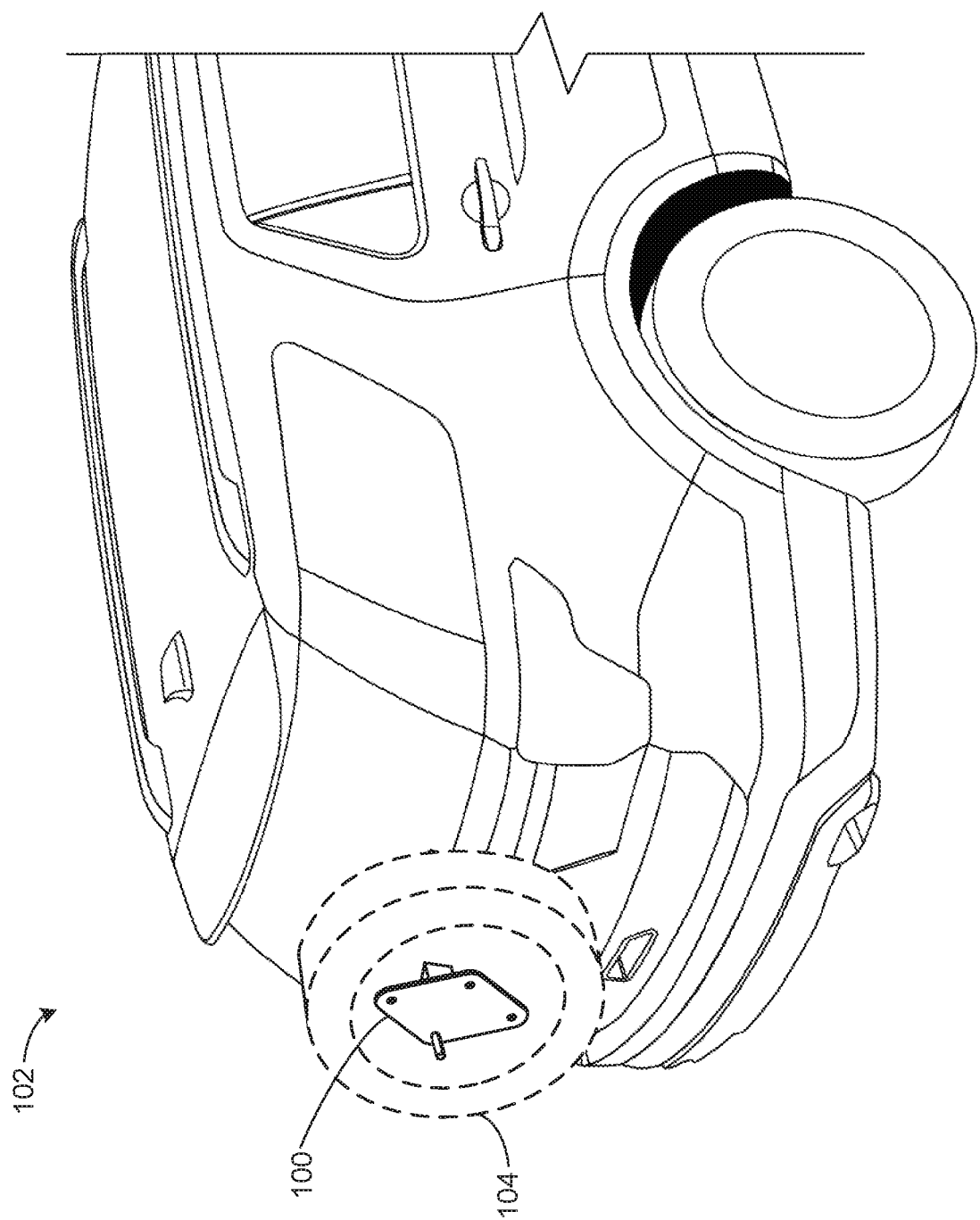
FIG. 1 is a perspective view of an example vehicle utilizing a multi-position wheel mount to carry a wheel.

Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located there between. Stating that any part is in contact with another part means that there is no intermediate part between the two parts.

DETAILED DESCRIPTION

Conventional wheel mounts often only allow for a single mounting position of the wheel, and the position at which the wheel is mounted is defined by the design of the wheel mount. Additionally, some known wheel mounts do allow for multiple mounting positions of the wheel, but do so based upon relative motion between multiple members of the mount, introducing a level of complexity to the mount. For example, a rotation between two or more members of the mount or a translation between two or more members of the mount. Such wheel mounts introduce additional complexity by including locking mechanisms to lock in the position of the wheel once selected.

Examples disclosed herein implement a wheel mount (e.g., bracket, a mounting plate, a mount, etc.) having one body (e.g., a unitary member, a unitary body, etc.) capable of mounting a wheel in two or more positions. Set forth in greater detail below, the body of the wheel mount includes a mechanism to couple the mount to a body of a vehicle and a mechanism to couple the mount to the wheel. The mechanism to couple the mount to the wheel, in some examples, includes a plate, which further includes one or more posts extending from the plate and multiple apertures defined by the plate.

The posts extending from the plate are sized to receive apertures included in a bolt hole circle of a wheel. Additionally, the apertures defined by the plate are sized to receive fasteners, which are further to be received by apertures included in the bolt hole circle (e.g., bolt pattern) of the wheel. In the examples described herein, the posts extending from the plate and the apertures defined by the plate are spaced such that the bolt hole circle can be received in two or more configurations. As such, the wheel can be mounted on the plate in two or more positions, allowing the user of the vehicle to select a position to mount the wheel based on vehicle usage.

As will be discussed in greater detail below in connection with the teachings of this disclosure, the multi-position wheel mount can have various configurations and/or orientations, which may depend on a type and/or size of wheel to be mounted and/or characteristics associated with the vehicle on which the wheel is to be mounted. In examples disclosed herein, these configurations and/or orientations can be changed or altered to optimize a location of a first position and a second position at which the wheel can be mounted.

Turning to the figures, FIG. 1 illustrates an example wheel mount 100, described in further detail in connection with FIG. 3A, that is capable of implementing the teachings of this disclosure. In the illustrated example of FIG. 1, the wheel mount 100 is coupled to an example vehicle 102. In some examples, the wheel mount 100 is coupled to the vehicle 102 via a trailer hitch. Additionally or alternatively, the wheel mount 100 is coupled to the vehicle 102 by any other removably couplable mechanism. Additionally or alternatively, the wheel mount 100 is integral to the vehicle 102 (e.g., integral with the body of the vehicle 102).

Figure 2:
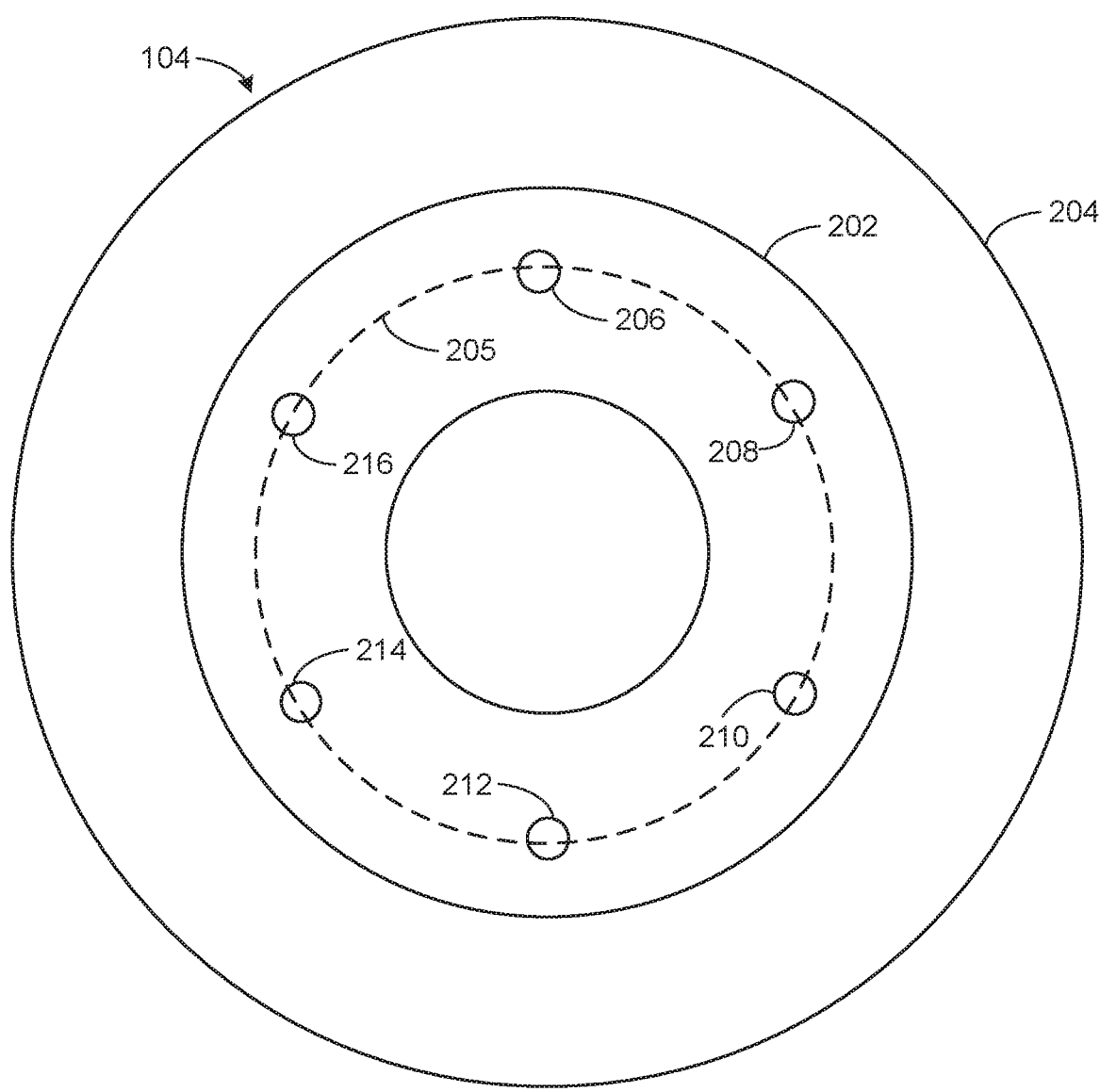
FIG. 2 is a front view of the example wheel of FIG. 1.

As shown in FIG. 1, an example wheel 104 (e.g., a vehicle wheel) described in further detail in connection with FIG. 2 is coupled to the wheel mount 100. In some examples, the wheel 104 can be coupled to the wheel mount 100 via one or more fasteners (e.g., bolts, nuts, etc.). Additionally or alternatively, the wheel 104 can be coupled to the wheel mount 100 via one or more posts. Additionally or alternatively, the wheel 104 can be coupled to the wheel mount 100 via some combination of fasteners and posts. The posts and/or fasteners are positioned such that the wheel mount 100 can hold the wheel 104 in two or more positions, where the two or more positions may be spaced a vertical distance from one another (e.g., two or more different vertical positions).

FIG. 2 is a front view of the example wheel 104 of FIG. 1. As shown in FIG. 2, the wheel 104 includes a rim 202. Mounted to the outer radius of the rim 202 is a tire 204. As such, the outer radius of the rim 202 defines the inner radius of the tire 204.

In some examples, the rim 202 defines a wheel bolt hole circle 205 (e.g., a bolt pattern) shown as a dashed line. The wheel bolt hole circle 205 includes apertures 206, 208, 210, 212, 214, and 216 (e.g., fastener apertures). The rim 202, the tire 204, and the wheel bolt hole circle 205 share a common central rotational axis. While in the illustrated example the wheel bolt hole circle 205 includes six apertures, the wheel bolt circle 205 can include any number of apertures.

The apertures 206, 208, 210, 212, 214, and 216 are sized and shaped to receive fasteners (e.g., bolts, nuts, etc.). While the apertures 206, 208, 210, 212, 214, and 216 have circular cross-sections in the illustrated example of FIG. 2, the apertures can be any shape capable of receiving fasteners. Additionally, each of the apertures 206, 208, 210, 212, 214, and 216 is spaced a radius away (e.g., 3 inches, 10 inches±0.05 inches, 40 mm±5 mm, etc.) from a central axis of the wheel 104, the radii equal to one another within a tolerance. Additionally, the apertures 206, 208, 210, 212, 214, and 216 are spaced equally within a tolerance (e.g., +/−1 degree, +/−0.25 rad, etc.) about the wheel bolt hole circle 205. For example, when the wheel bolt hole circle 205 includes six apertures as in the illustrated example of FIG. 2, the apertures are spaced approximately 60 degrees from one another. Additionally or alternatively, when the wheel bolt hole circle 205 includes five apertures, the apertures are spaced approximately 72 degrees from one another. As such, the distances between adjacent pairs of the apertures 206, 208, 210, 212, 214, and 216 (e.g., the apertures 206 and 208, the apertures 208 and 210, the apertures 212 and 214, etc.) are equal to one another within a tolerance (e.g., +/−0.05 inches, +/−3 mm, etc.).

Additionally, the distance between each first distal pair of the apertures 206, 208, 210, 212, 214, and 216 (e.g., two apertures with one aperture in between, such as the apertures 206 and 210, the apertures 208 and 212, the apertures 214 and 206, etc.) are equal to one another within a tolerance (e.g., +/−0.05 inches, +/−3 mm, etc.). Additionally, the distance between each second distal pair of the apertures 206, 208, 210, 212, 214, and 216 (e.g., two apertures with two apertures in between, such as the apertures 206 and 212, the apertures 208 and 214, the apertures 214 and 208, etc.) are equal to one another within a tolerance (e.g., +/−0.05 inches, +/−3 mm, etc.). Additionally, the distance between any adjacent and/or distal pairing of the apertures 206, 208, 210, 212, 214, and 216 (e.g., third distal pair, fifth distal pair, etc.) are equal to one another within a tolerance.

Figure 3A:
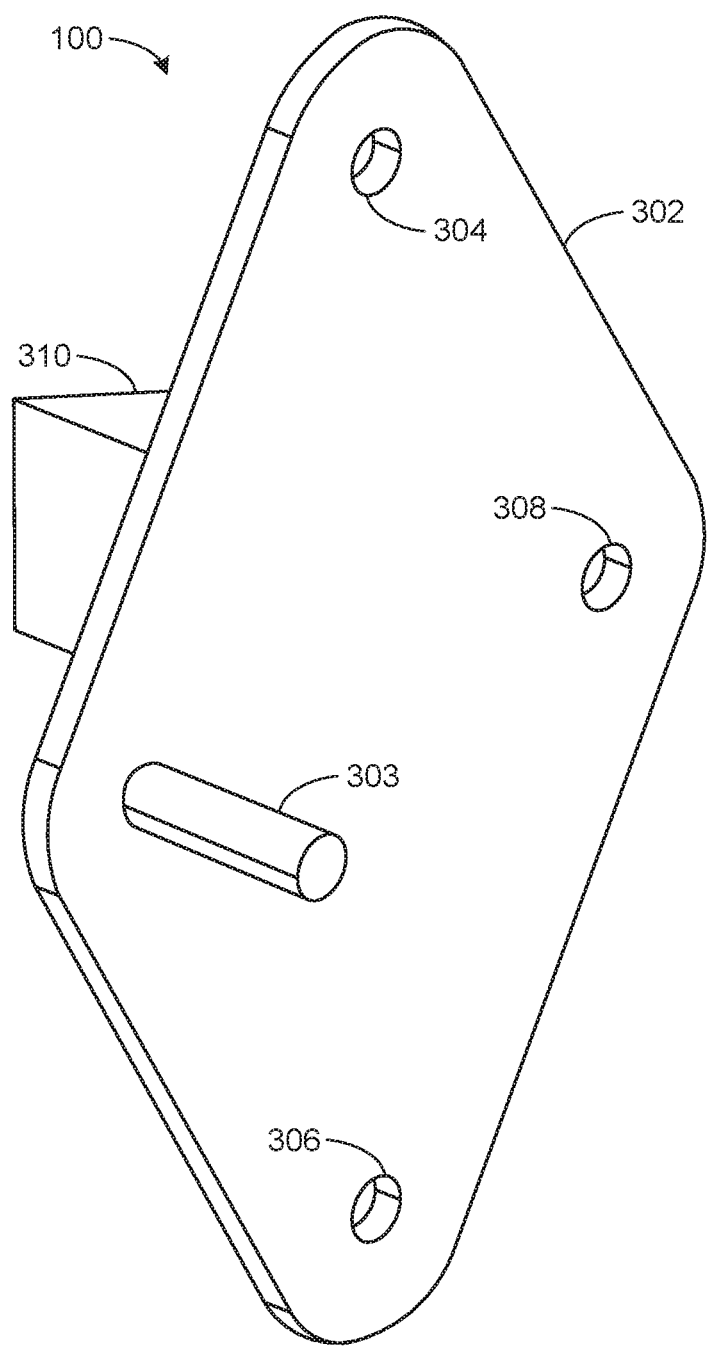
FIG. 3A is an isometric view of the example wheel mount of FIG. 1.

FIG. 3A is an isometric view of the wheel mount 100 of FIG. 1. In the illustrated example of FIG. 3A, the wheel mount 100 includes a plate 302. While the plate 302 in the illustrated example of FIG. 3A is generally diamond shaped, the plate 302 can be any shape (e.g., a square, a circle, a triangle, etc.) suitable for receiving the wheel 104. In some examples, the plate 302 can be a standard thickness (e.g., ⅛ inch, ¼ inch, ⅜, inch, ½ inch, etc.). Additionally or alternatively, the plate 302 can be any thickness suitable for mounting the wheel 104 of FIG. 2 to the wheel mount 100.

The wheel mount 100 further includes a post 303 (e.g., a stud) extending from the plate 302. In some examples, the post 303 extends along an axis that is substantially perpendicular to a plane defined by the plate 302. In some examples, the post 303 is coupled to the plate 302 via an interference fit or press fit. Additionally or alternatively, the post 303 may be threaded and may be threadably engaged with a threaded hole of the plate 302. Additionally or alternatively, the plate 302 and the post 303 can be integrally formed as a unitary body. Additionally or alternatively, any other suitable fastening method or technique (e.g., a weld, etc.) may be used to couple the post 303 to the plate 302.

In some examples, the post 303 is sized to slidably receive one of the apertures 206, 208, 210, 212, 214, and 216 of the wheel 104. While in the illustrated example, the post 303 is cylindrical, the post 303 can be any other shape capable of slidably receiving one of the apertures 206, 208, 210, 212, 214, and 216.

In the illustrated example, the plate 302 further includes apertures 304, 306, and 308 (e.g., openings, through holes, etc.) As used herein, a set of apertures may include one or more of the apertures 304, 306, and 308. In other examples, the plate 302 can include additional or fewer apertures. While the apertures 304, 306, and 308 are cylindrical in the illustrated example of FIG. 3A, the apertures 304, 306, and 308 may be any size and/or shape capable of receiving fasteners.

In the illustrated example, the post 303 and the apertures 304, 306, and 308 are spaced a distance apart in the plane of the plate 302 based on the wheel bolt hole circle 205 of FIG. 2. For example, in the illustrated example of FIG. 3A, the distance between the apertures 304 and 308 is equal to the distance between any first distal pair of the apertures 206, 208, 210, 212, 214, and 216 within a tolerance. Additionally, the distance between the apertures 306 and 308 is also equal to the distance between any first distal pair of the apertures 206, 208, 210, 212, 214, and 216 within a tolerance.

Additionally, in some examples such as the example wheel mount 100 of FIG. 3A, the distance between the post 303 and each of the apertures 304, 306, and 308 is equal to the distance between any first distal pair of the apertures 206, 208, 210, 212, 214, and 216 within a tolerance. Further in the illustrated example of FIG. 3A, the post 303 is equidistant from each of the apertures 304, 306, and 308 within a tolerance.

While in the illustrated example of FIG. 3A the distance between the post 303 and the apertures 304, 306, and 308 is as described, any other spacing such that the post 303 and the apertures 304, 306, and 308 align with the apertures 206, 208, 210, 212, 214, and 216 of the wheel 104 in two or more configurations or positions may be used. For example, the post 303 and the apertures 304, 306, and 308 may be spaced such that distance between the post 303 and the apertures 304, 306, and 308, the apertures 304 and 308, and/or the apertures 306 and 308 is equal to the distance between any two adjacent apertures 206, 208, 210, 212, 214, and 216 arranged along the wheel bolt hole circle 205 within a tolerance.

The wheel mount 100 further includes a mounting boss 310 that is unitary with the plate 302. For example, the plate 302 and the mounting boss 310 are integrally formed as a single (e.g., unitary) body. Additionally, the mounting boss 310 is further sized to couple to the vehicle 102. For example, the mounting boss 310 can be sized to couple to a trailer hitch receiver of the vehicle 102. Additionally or alternatively, the mounting boss 310 can be any geometry capable of coupling the wheel mount 100 to the vehicle 102.

Figure 3B:
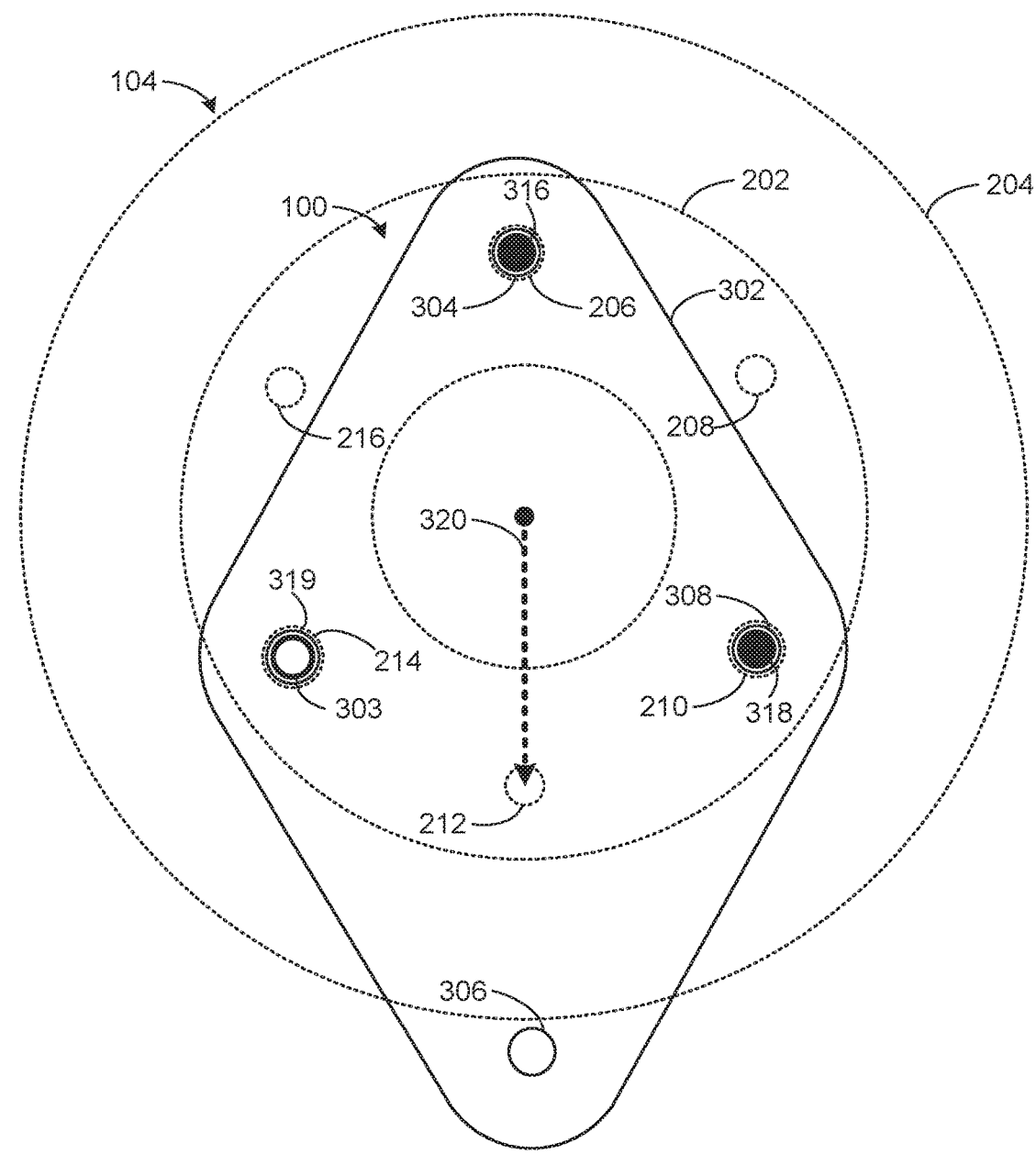
FIG. 3B is a front view of the wheel of FIG. 2 mounted to the example wheel mount of FIG. 3A in a first position.

FIG. 3B is a front view of the example wheel 104 mounted to the wheel mount 100 of FIG. 3A in a first position (e.g., the wheel 104 is held to the wheel mount 100 in the first position). In the illustrated example, the wheel mount 100 and the wheel 104 are coupled with fasteners 316 and 318. The fasteners 316 and 318 can be, but are not limited to, bolts, nuts, etc. Additionally, while in the illustrated example two fasteners are used, any number of fasteners may be used. As used herein, a set of fasteners may include one or more of the fasteners 316 and 318.

In the illustrated example of FIG. 3B, to mount the wheel 104 to the wheel mount 100, the fastener 316 is received by the aperture 206 of the wheel 104 and the aperture 304 of the wheel mount 100. Additionally, the fastener 318 is received by the aperture 210 of the wheel 104 and the aperture 308 of the wheel mount 100. Additionally, the post 303 of the wheel mount 100 is received by the aperture 214 of the wheel 104. In some examples, the post 303 is further to receive a fastener 319, wherein the fastener 319 promotes engagement of the post 303 to the aperture 214. The fastener 319 can be, but is not limited to, a bolt, a nut, a clasp, etc. Additionally, while in the illustrated example the apertures 206 and 210 receive the fasteners 316 and 318, respectively, and the aperture 216 receives the post 303, any of the apertures 206, 208, 210, 212, 214, and 216 associated with the wheel bolt hole circle 205 may receive the fasteners 316 and 318 and the post 303.

Figure 3C:
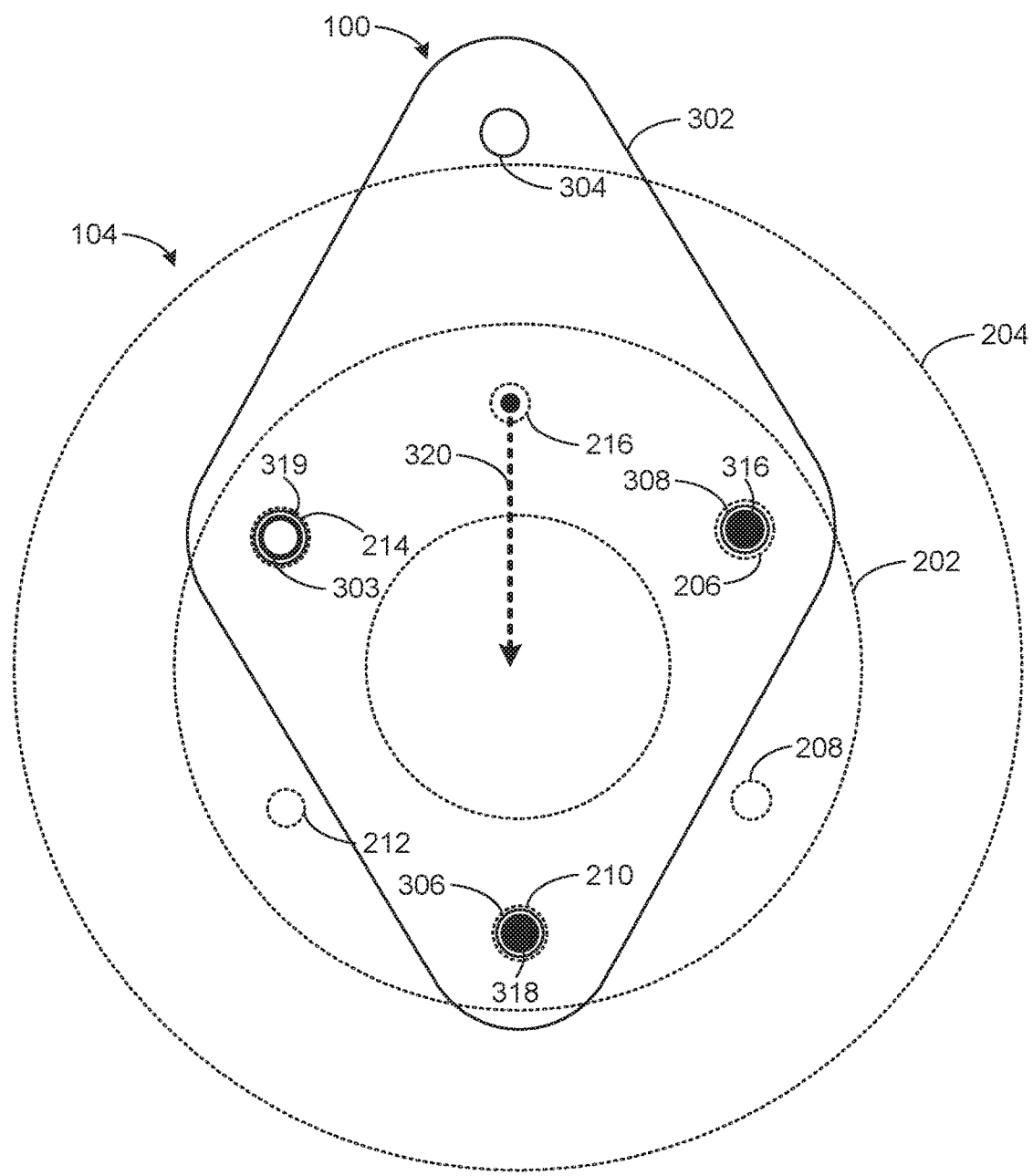
FIG. 3C is a front view of the wheel of FIG. 2 mounted to the example wheel mount of FIG. 3A in a second position.

To mount the wheel 104 in a second position as shown in FIG. 3C, the second position spaced a distance away from the first position as shown in FIG. 3B, the fastener 316 is received by the aperture 206 of the wheel 104 and the aperture 308 of the wheel mount 100. Additionally, the fastener 318 is received by the aperture 210 of the wheel 104 and the aperture 306 of the wheel mount 100. Additionally, the post 303 of the wheel mount 100 is received by the aperture 214 of the wheel 104. In some examples, the post 303 is still to receive the fastener 319, wherein the fastener 319 promotes engagement of the post 303 to the aperture 214. As the post 303 is received by the aperture 214 in both FIGS. 3B and 3C, the wheel 104 can be rotated on the post 303 about the aperture 214 to transfer the wheel 104 from the first position shown in FIG. 3B to the second position shown in FIG. 3C. As such, removal of the wheel 104 from the wheel mount 100 is not necessary.

While in the illustrated example the distance between the first position of the wheel 104 illustrated in FIG. 3B and the second position of the wheel 104 illustrated in FIG. 3C extends along an axis 320 (along a vertical axis as shown in FIGS. 3B (first vertical position) and 3C (second vertical position)), the distance can extend in any direction along any other axis.

Additionally, while in the illustrated example the apertures 206 and 210 receive the fasteners 316 and 318, respectively, and the aperture 214 receives the post 303, any of the apertures 206, 208, 210, 212, 214, and 216 associated with the wheel bolt hole circle 205 may receive the fasteners 316 and 318 and the post 303.

Additionally, while sets of the apertures 304, 306, and 308 utilized to hold the wheel 104 in the first position (e.g., the apertures 304 and 308) as shown in FIG. 3B and in the second position (e.g., the apertures 306 and 308) as shown in FIG. 3C share a common aperture (e.g., the aperture 308), the first and second sets of apertures 304, 306, and 308 may or may not share a common aperture.

Figure 4A:
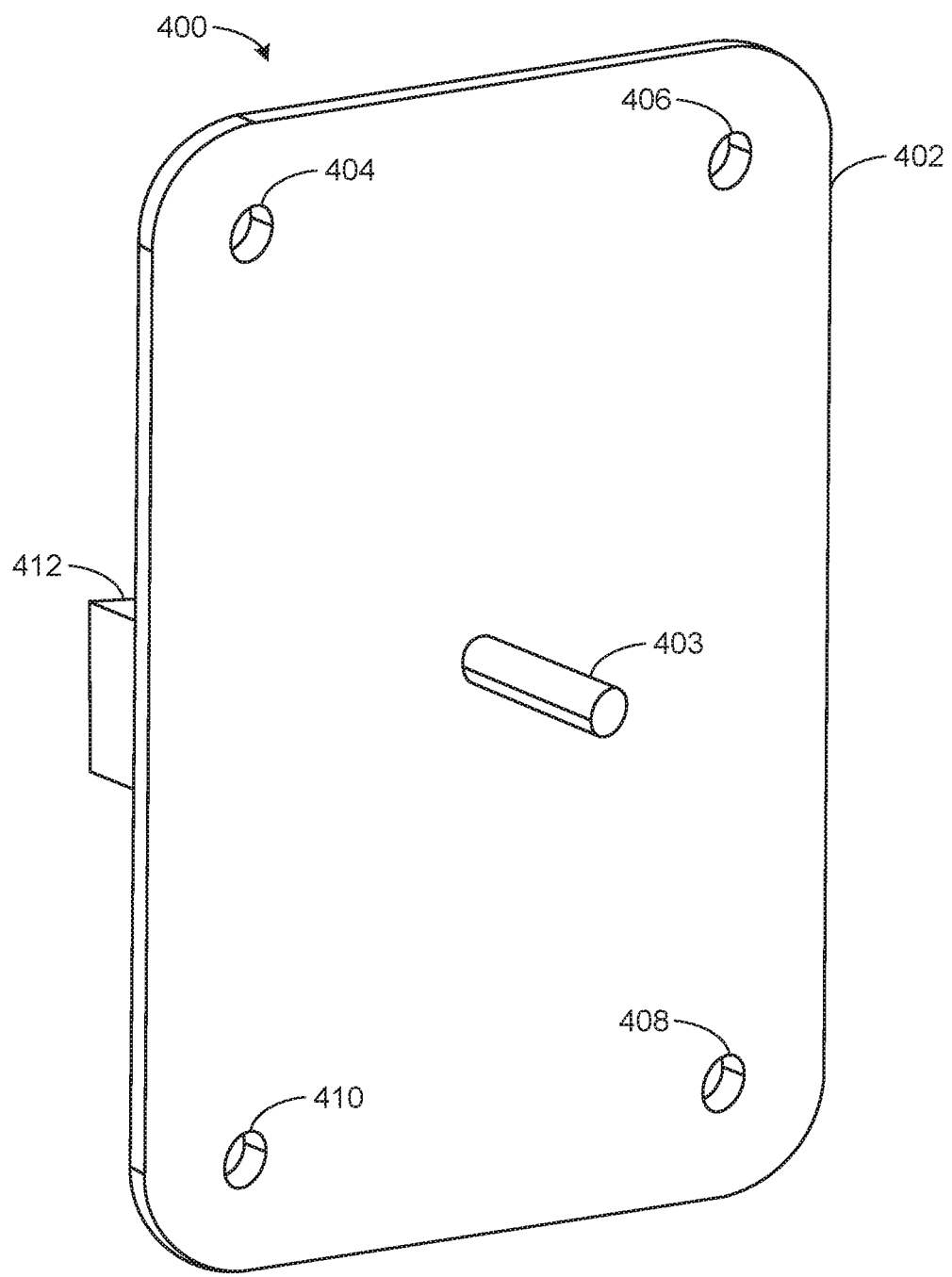
FIG. 4A is an isometric view of a second example wheel mount.

FIG. 4A is an isometric view of a second example wheel mount 400. In the illustrated example of FIG. 4A, the wheel mount 400 includes a plate 402. The plate 402 is similar to the plate 302 described in connection with the wheel mount 100 of FIG. 3A. Additionally, while the plate 402 in the illustrated example of FIG. 4A has a generally rectangular shape, the plate 402 can be any shape (e.g., a square, a circle, a triangle, etc.) suitable for receiving the wheel 104 of FIG. 2.

The wheel mount 400 further includes a post 403 (e.g., a post) extending from the plate 402. The post 403 is similar to the post 303 described in connection with the wheel mount 100 of FIG. 3A.

In the illustrated example, the plate 402 further includes apertures 404, 406, 408, and 410 (e.g., openings, through holes, etc.). As used herein, a set of apertures may include one or more of the apertures 404, 406, 308, and 410. In other examples, the plate 402 can include additional or fewer apertures. The apertures 404, 406, 408, and 410 are sized and shaped to receive fasteners.

In the illustrated example, the post 403 and the apertures 404, 406, 408, and 410 are spaced a distance apart in the plane of the plate 402 based on the wheel bolt hole circle 205. For example, in the illustrated example of FIG. 4A, the distance between the apertures 404 and 406 is equal to the distance between any first distal pair of the apertures 206, 208, 210, 212, 214, and 216 within a tolerance. Additionally, the distance between the apertures 408 and 410 is also equal to the distance between any first distal pair of the apertures 206, 208, 210, 212, 214, and 216 within a tolerance.

Additionally, in some examples, such as the example wheel mount 400 of FIG. 4A, the distance between the post 403 and each of the apertures 404, 406, 408, and 410 is equal to the distance between any first distal pair of the apertures 206, 208, 210, 212, 214, and 216 within a tolerance. As such, in the illustrated example of FIG. 4A, the post 403 is equidistant from each of the apertures 404, 406, 408, and 410 within a tolerance.

While in the illustrated example of FIG. 4A the distance between the post 403 and the apertures 404, 406, 408, and 410 is as described, any other spacing such that the post 403 and the apertures 404, 406, 408, and 410 align with the apertures 206, 208, 210, 212, 214, and 216 of the wheel 104 in two or more configurations or positions may be used. For example, the post 403 and the apertures 404, 406, 408, and 410 may be spaced such that distance between the post 403 and the apertures 404, 406, 408, and 410, the apertures 404 and 406, and/or the apertures 406 and 408 is equal to the distance between any two adjacent apertures of the wheel bolt hole circle 205 within a tolerance.

The wheel mount 400 further includes a mounting boss 412 that is similar to the mounting boss 310 of the wheel mount 100 described in connection with FIG. 3A.

Figure 4B:
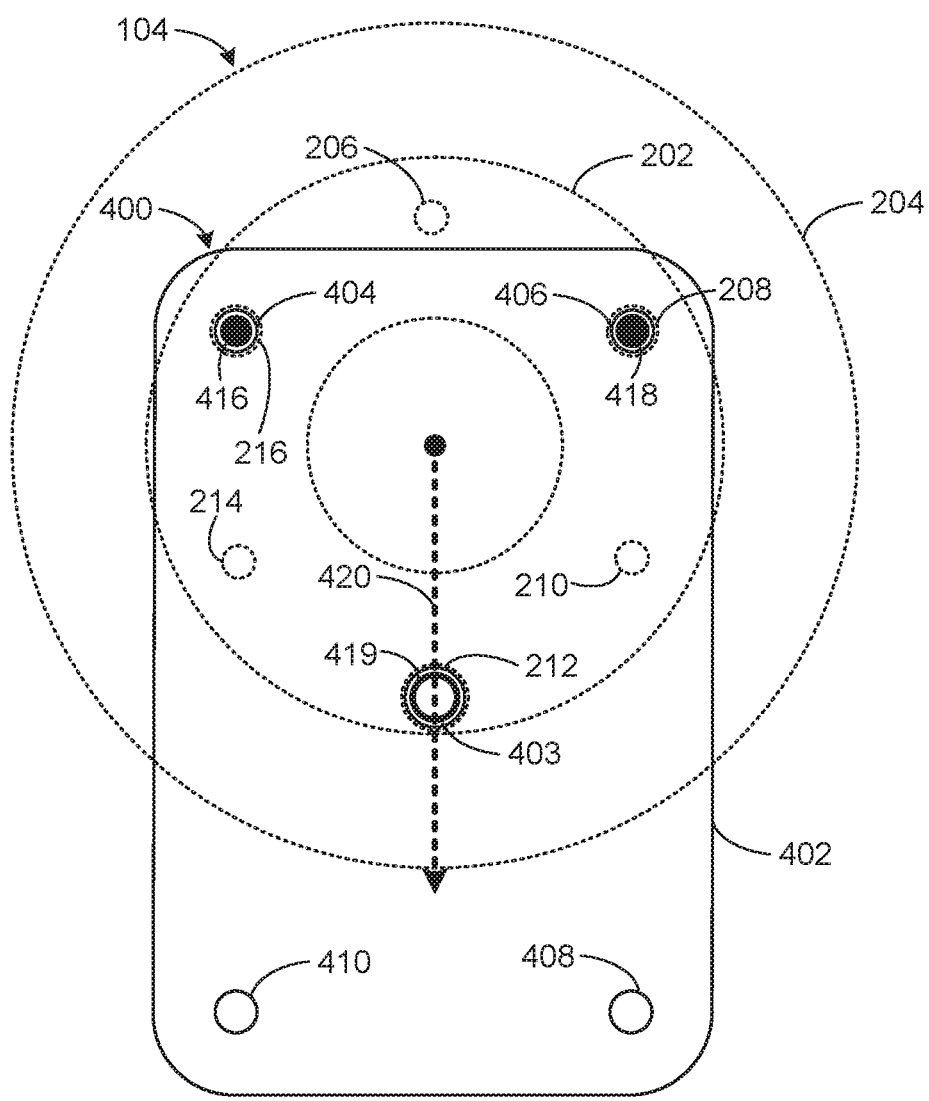
FIG. 4B is a front view of the wheel of FIG. 2 mounted to the second example wheel mount of FIG. 4A in a first position.

FIG. 4B is a front view of the example wheel 104 mounted to the wheel mount 400 of FIG. 4A in a first position (e.g., the wheel 104 is held to the wheel mount 400 in the first position, a high position in the illustrated example). In the illustrated example, the wheel mount 400 and the wheel 104 are coupled with fasteners 416, and 418. The fasteners 416 and 418 can be, but are not limited to, bolts, nuts, etc. Additionally, while in the illustrated example two fasteners are used, any number of fasteners may be used. As used herein, a set of fasteners may include one or more of the fasteners 416 and 418.

In the illustrated example of FIG. 4B, to mount the wheel 104 to the wheel mount 400, the fastener 416 is received by the aperture 216 of the wheel 104 and the aperture 404 of the wheel mount 400. Additionally, the fastener 418 is received by the aperture 208 of the wheel 104 and the aperture 406 of the wheel mount 100. Additionally, the post 403 of the wheel mount 400 is received by the aperture 212 of the wheel 104. In some examples, the post 403 is further to receive a fastener 419, wherein the fastener 419 promotes engagement of the post 403 to the aperture 212. The fastener 419 can be, but is not limited to, a bolt, a nut, a clasp, etc. Additionally, while in the illustrated example the apertures 208 and 216 receive the fasteners 416 and 418, respectively, and the aperture 212 receives the post 403, any of the apertures 206, 208, 210, 212, 214, and 216 arranged along the wheel bolt hole circle 205 may receive the fasteners 416 and 418 and the post 403.

To mount the wheel 104 in a second position spaced a distance away from the first position as shown in FIG. 4B, the fastener 416 is received by the aperture 208 of the wheel 104 and the aperture 410 of the wheel mount 400, the fastener 418 is received by the aperture 216 of the wheel 104 and the aperture 408 of the wheel mount 400, and the post 403 is received by the aperture 212 of the wheel 104. In some examples, the post 403 is still to receive the fastener 419, wherein the fastener 419 promotes engagement of the post 403 to the aperture 212. As the post 403 is received by the aperture 212 in both configurations shown in FIGS. 4B and 4C, the wheel 104 can be rotated on the post 403 about the aperture 212 to transfer the wheel 104 from the first position of FIG. 4B to the second position of FIG. 4C. As such, removal of the wheel 104 from the wheel mount 400 is not necessary.

While in the illustrated example the apertures 208 and 216 receive the fasteners 416 and 418, respectively, and the aperture 212 receives the post 403, any of the apertures 206, 208, 210, 212, 214, and 216 associated with the wheel bolt hole circle 205 may receive the fasteners 416 and 418 and the post 403.

Figure 4C:
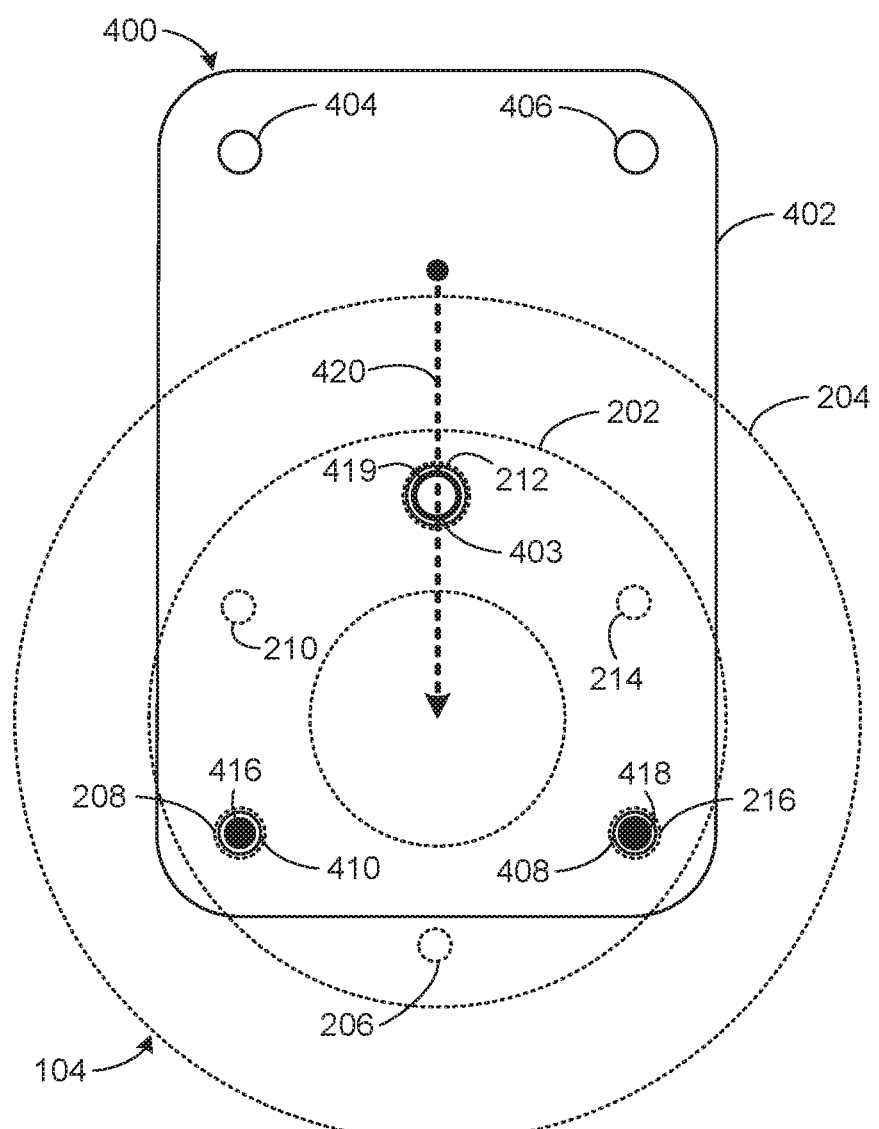
FIG. 4C is a front view of the wheel of FIG. 2 mounted to the second example wheel mount of FIG. 4A in a second position.

Additionally, while in the illustrated example the distance between the first position (e.g., a first vertical position, a high position) of the wheel 104 illustrated in FIG. 4B and the second position (e.g., a second vertical position, a low position) of the wheel 104 illustrated in FIG. 4C extends along an axis 420 (along a vertical axis as shown in FIGS. 4B and 4C), the distance can extend in any direction along any other axis.

Additionally, while sets of the apertures 404, 406, 408, and 410 utilized to hold the wheel 104 in the first position (e.g., the apertures 404 and 406) as shown in FIG. 4B and in the second position (e.g., the apertures 408 and 410) as shown in FIG. 4C do not share a common aperture, the first and second sets of apertures 404, 406, 408, and 410 may or may not share a common aperture.

Figure 5:
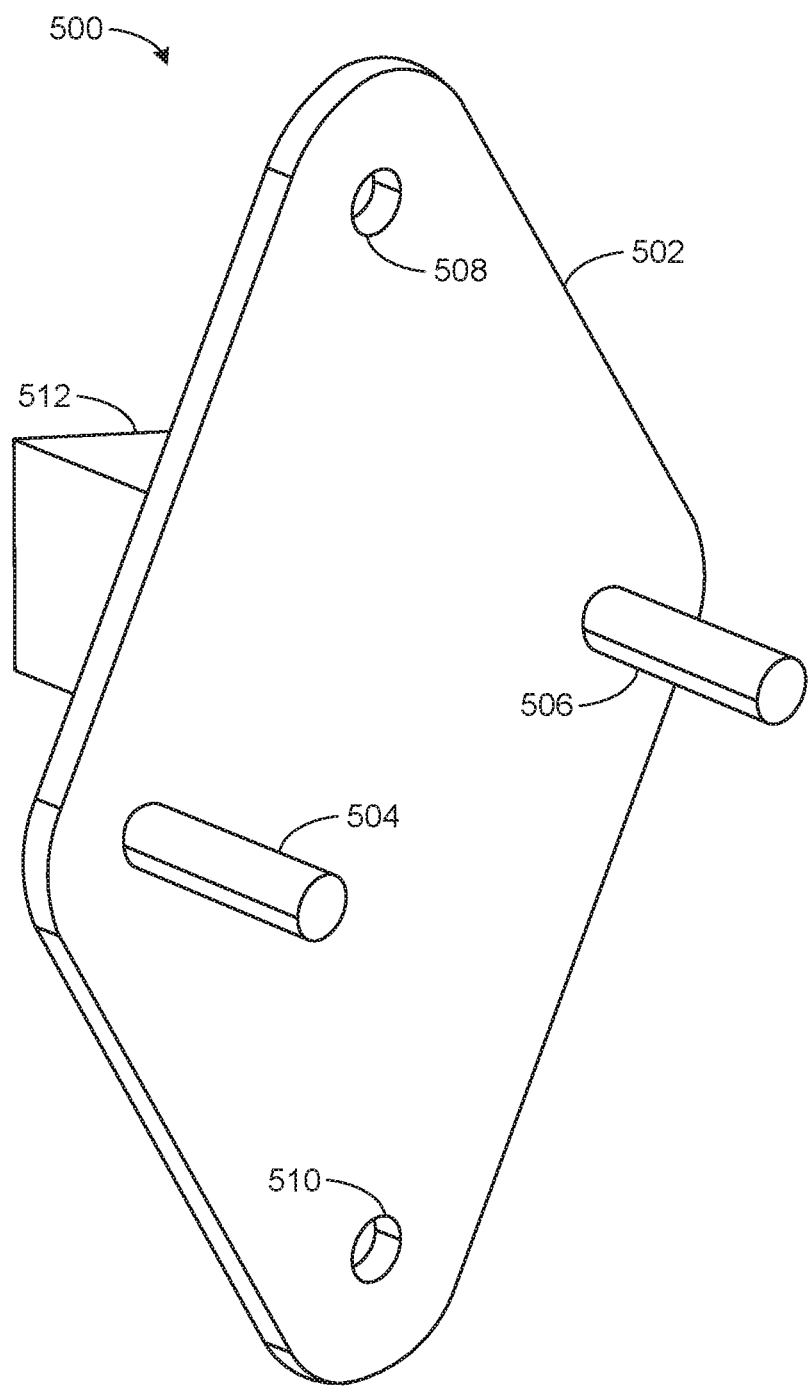
FIG. 5 is an isometric view of a third example wheel mount.

FIG. 5 is an isometric view of a third example wheel mount 500. In the illustrated example of FIG. 5, the wheel mount 500 includes a plate 502 that is similar to the plate 302 described in connection with the wheel mount 100 of FIG. 3A.

The wheel mount 500 further includes posts 504 and 506 (e.g., studs) extending from the plate 502. The posts 504 and 506 are similar to the post 303 described in connection with the wheel mount 100 of FIG. 3A.

In the illustrated example, the plate 502 further includes apertures 508 and 510 (e.g., openings, through holes, etc.). In other examples, the plate 502 can include additional or fewer apertures. In some examples, the apertures 508 and 510 are sized and shaped to receive fasteners.

In the illustrated example, the posts 504 and 506 and the apertures 508 and 510 are spaced a distance apart in the plane of the plate 502 based on the wheel bolt hole circle 205. For example, in the illustrated example of FIG. 5, the distance between the post 504 and the aperture 508, the aperture 508 and the post 506, the post 506 and the aperture 510, the aperture 510 and the post 504, and the post 504 and the post 506 is equal to the distance between any first distal pair of the apertures 206, 208, 210, 212, 214, and 216 within a tolerance.

While in the illustrated example of FIG. 5 the distance between the posts 504 and 506 and the apertures 508 and 510 is as described, any other spacing such that the posts 504 and 506 and the apertures 508 and 510 align with the apertures 206, 208, 210, 212, 214, and 216 of the wheel 104 in two or more configurations or positions may be used. For example, the posts 504 and 506 and the apertures 508 and 510 may be spaced such that distance between the post 504 and the aperture 508, the aperture 508 and the post 506, the post 506 and the aperture 510, the aperture 510 and the post 504, and the post 504 and the post 506 is equal to the distance between any two adjacent apertures of the wheel bolt hole circle 205 within a tolerance.

The wheel mount 500 further includes a mounting boss 512, the mounting boss 512 similar to the mounting boss 310 of the wheel mount 100 described in connection with FIG. 3A.

Figure 6:
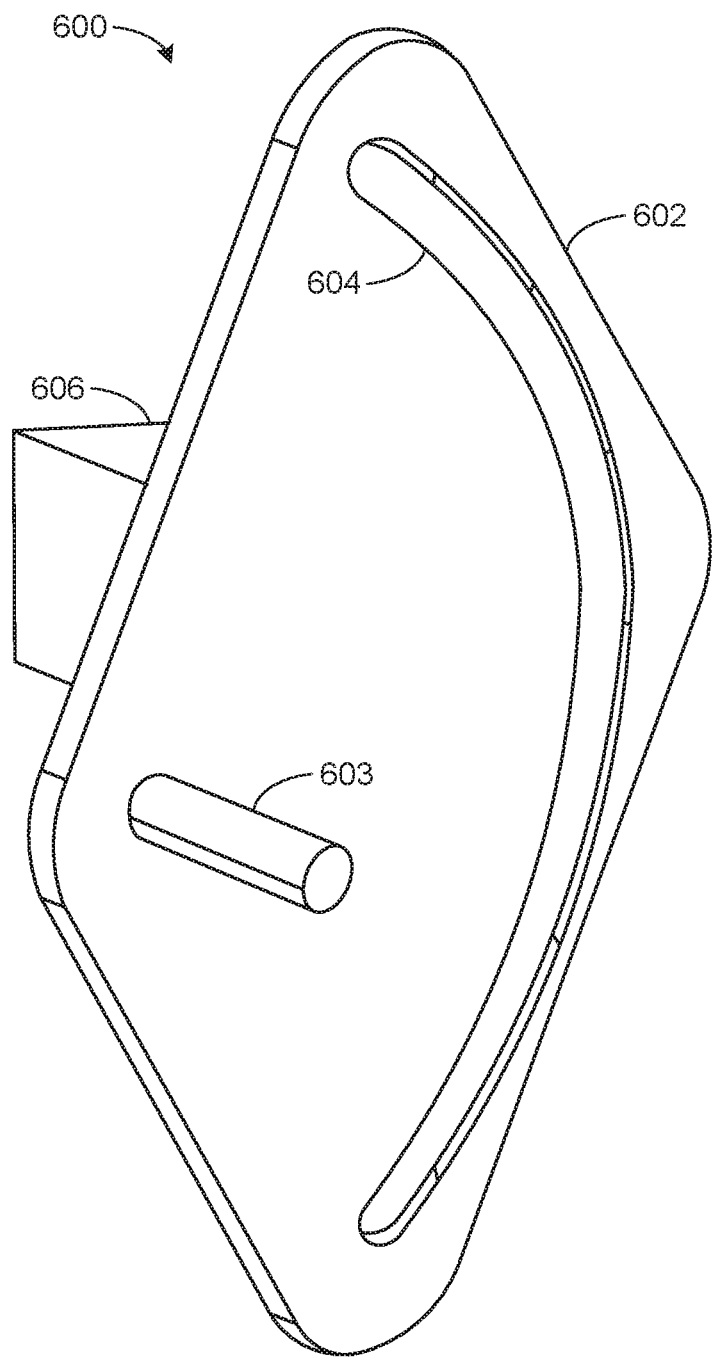
FIG. 6 is an isometric view of a fourth example wheel mount.

FIG. 6 is an isometric view of a fourth example wheel mount 600. In the illustrated example of FIG. 6, the wheel mount 600 includes a plate 602 that is similar to the plate 302 described in connection with the wheel mount 100 of FIG. 3A. The wheel mount 600 further includes a post 603 (e.g., a stud) extending from the plate 602. The post 603 is similar to the post 303 described in connection with the wheel mount 100 of FIG. 3A.

In the illustrated example, the plate 602 further includes an aperture 604 (e.g., an opening or through hole). In other examples, the plate 402 can include additional or fewer apertures. In the illustrated example of FIG. 6, the aperture 604 is a curved slot. The slot geometry of the aperture 604 is sized and shaped to receive fasteners. Additionally, the geometry of the slot shaped aperture 604 is selected such that each point along a centerline (e.g., a midpoint of the width) of the aperture 604 is equidistant to the post 603 within a tolerance. In the illustrated example of FIG. 6, the distance between the centerline of the aperture 604 and the post 603 is equal to the distance between any first distal pair of the apertures 206, 208, 210, 212, 214, and 216 within a tolerance.

While in the illustrated example of FIG. 6 the distance between the post 603 and the centerline of the aperture 604 is as described, any other spacing such that the post 603 and two positions of the aperture 604 align with three or more of the apertures 206, 208, 210, 212, 214, and 216 of the wheel 104 in two or more configurations or positions may be used. For example, the post 603 and the aperture 604 may be spaced such that distance between the post 603 and the centerline of the aperture 604 is equal to the distance between any two adjacent apertures of the wheel bolt hole circle 205 within a tolerance.

The wheel mount 600 further includes a mounting boss 606, the mounting boss 606 similar to the mounting boss 310 of the wheel mount 100 described in connection with FIG. 3A.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

From the foregoing, it will be appreciated that example apparatus have been disclosed that implement a wheel mount that is capable of mounting a vehicle wheel in two or more positions, in some examples two or more positions along a vertical axis, through the use of a combination of posts and apertures to receive fasteners that align with apertures of a wheel bolt hole circle in multiple configurations.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a mounting plate to be coupled to a vehicle;
a first stud extending from the mounting plate; and
an aperture in the mounting plate arranged such that the first stud and a fastener received by the aperture are to hold a vehicle wheel coupled to the mounting plate at a first position and a second position spaced from the first position, the vehicle wheel transferable to the second position from the first position by rotating the vehicle wheel about the first stud.

2. The apparatus of claim 1, wherein the aperture in the mounting plate is a slot, the slot defined such that:
the first stud and the fastener received at a first position of the slot hold the vehicle wheel coupled to the mounting plate at the first position; and
the first stud and the fastener received at a second position of the slot hold the vehicle wheel coupled to the mounting plate at the second position.

3. The apparatus of claim 1, wherein the mounting plate includes a plurality of apertures.

4. The apparatus of claim 3, wherein:
the first stud and a set of fasteners received at a first one and a second one of the plurality of apertures hold the vehicle wheel coupled to the mounting plate at the first position; and
the first stud and the set of fasteners received at the second one and a third one of the plurality of apertures hold the vehicle wheel coupled to the mounting plate at the second position.

5. The apparatus of claim 3, wherein:
the first stud and a set of fasteners received at a first one and a second one of the plurality of apertures hold the vehicle wheel coupled to the mounting plate at the first position; and
the first stud and the set of fasteners received at a third one and a fourth one of the plurality of apertures hold the vehicle wheel coupled to the mounting plate at the second position.

6. The apparatus of claim 3, further including a second stud extending from the mounting plate.

7. The apparatus of claim 6, wherein:
the first stud, the second stud, and the fastener received at a first one of the plurality of apertures hold the vehicle wheel coupled to the mounting plate at the first position; and
the first stud, the second stud, and the fastener received at a second one of the plurality of apertures hold the vehicle wheel coupled to the mounting plate at the second position.

8. An apparatus comprising:
a bracket having a first post extending therefrom and an aperture spaced from the first post, the first post to slidably receive one of a plurality of fastener apertures in a vehicle wheel, the aperture of the bracket to receive a fastener extending through a respective other one of the fastener apertures to hold the vehicle wheel to a vehicle body at a first position and a second position, the vehicle wheel transferable to the second position from the first position by rotating the vehicle wheel about the first post.

9. The apparatus of claim 8, wherein the aperture of the bracket is a slot.

10. The apparatus of claim 8, wherein the bracket includes a plurality of apertures, a first set of the plurality of apertures of the bracket hold the vehicle wheel to the vehicle body in the first position and a second set of the plurality of apertures of the bracket hold the vehicle wheel to the vehicle body in the second position.

11. The apparatus of claim 10, wherein the first set of the plurality of apertures and the second set of the plurality of apertures include a common aperture.

12. The apparatus of claim 10, wherein the first set of the plurality of apertures and the second set of the plurality of apertures do not include a common aperture.

13. The apparatus of claim 10, further including a second post extending from the bracket, wherein:
the first post, the second post, and the fastener received by a first one of the plurality of apertures of the bracket are to hold the vehicle wheel to the vehicle body at the first position; and
the first post, the second post, and the fastener received by a second aperture of the plurality of apertures of the bracket are to hold the vehicle wheel to the vehicle body at the second position spaced from the first position.

14. The apparatus of claim 8, wherein the first post and the aperture of the bracket are located on the bracket to correspond to a bolt pattern of the vehicle wheel.

15. An apparatus comprising:
a wheel mount to be fixed to a vehicle, the wheel mount including:
    means for slidably receiving a first aperture of a vehicle wheel; and
    means for receiving a fastener passing through a second aperture of the vehicle wheel to hold the vehicle wheel at a first position and a second position, the vehicle wheel transferable to the second position from the first position by rotating the vehicle wheel about the means for slidably receiving.

16. The apparatus of claim 15, wherein the means for receiving includes a slot, the slot to receive the fastener in a first position of the slot to hold the vehicle wheel at the first position and in a second position of the slot to hold the vehicle wheel at the second position.

17. The apparatus of claim 15, wherein a first set of means for receiving holds the vehicle wheel in the first position and a second set of means for receiving holds the vehicle wheel in the second position.

18. The apparatus of claim 17, wherein the first set of the means for receiving and the second set of the means for receiving share at least one common means for receiving.

19. The apparatus of claim 17, wherein the first set of the means for receiving and the second set of the means for receiving do not share a common means for receiving.

20. The apparatus of claim 15, wherein the means for slidably receiving is spaced a distance away from the means for receiving in a plane defined by the wheel mount, the distance based upon a distance between the first aperture and the second aperture associated with a bolt circle of the vehicle wheel.

* * * * *